F. P. DEWEL.
STAVE JOINTING MACHINE.

No. 118,215.

PATENTED AUG. 22 1871

ATTEST
Myron H. Church
H. F. Eberts

INVENTOR
F. P. Dewel
per Atty
Thos. S. Sprague

UNITED STATES PATENT OFFICE.

FREDERIC P. DEUEL, OF TECUMSEH, MICHIGAN.

IMPROVEMENT IN STAVE-JOINTERS.

Specification forming part of Letters Patent No. 118,215, dated August 22, 1871.

*To all whom it may concern:*

Be it known that I, FREDERIC P. DEUEL, of Tecumseh, in the county of Lenawee and State of Michigan, have invented a new and useful Improvement in Stave-Jointing Machines; and I do declare that the following is a true and accurate description thereof, reference being had to the accompanying drawing and to the letters of reference marked thereon, and being a part of this specification, in which—

Figure 1:
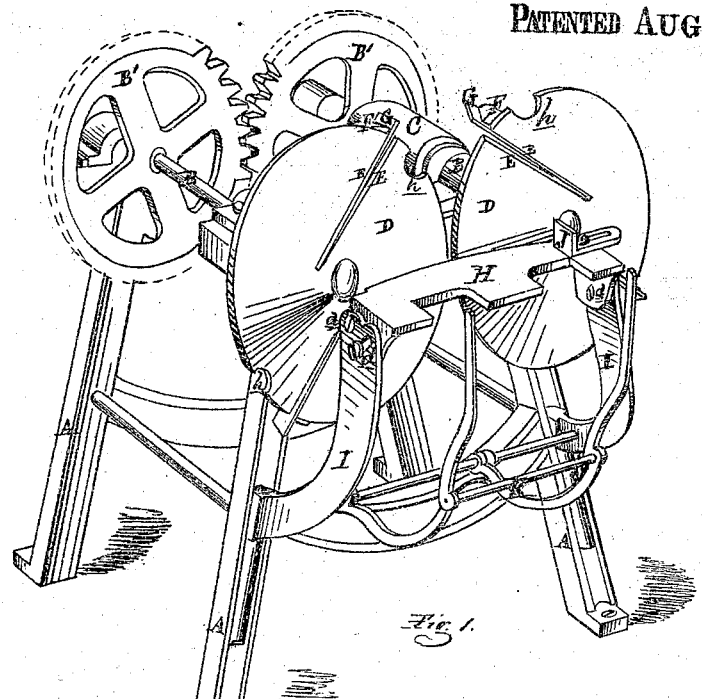
Figure 2:
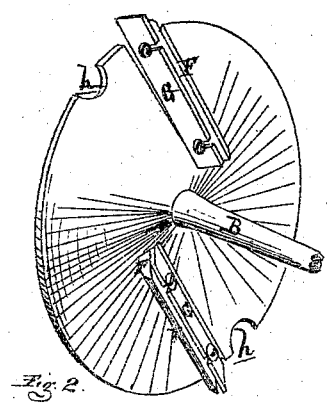
Figure 3:
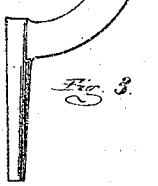
Figure 4:
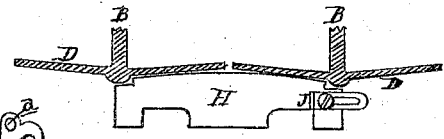

Figure 1 is a perspective of my invention. Fig. 2 is a perspective from the rear of one of the face-plates. Fig. 3 is a plan of one of the table-rests. Fig. 4 is a plan of a section, showing the top of the face-plates and table.

Like letters refer to like parts in each figure.

The nature of this invention relates to an improvement in that class of wood-working machines which is designed to finish the edges of staves for all kinds of casks, so constructed that it will joint the staves for any desired cask upon any desired angle. The invention consists in the combination and arrangement of the various parts, as more fully hereinafter set forth.

In the accompanying drawing, A represents a suitable frame which supports the working part of the machine. Upon the top of this frame and in proper boxes are journaled the shafts B, which are provided with geared wheels B' of the same size and meshing into each other, causing the shafts to rotate in opposite directions when motion is communicated to one of them through the pulley C and any suitable power. Upon the outer ends of these shafts are rigidly secured the face-plates D, which are of the same size, and their outer faces slightly concave from the center or hub to the periphery. Cut through these face-plates are the slots or openings with parallel sides, E, extending from a vertical line through the center of the plates to the periphery, and in the position and relation to each other shown in the drawing. Upon a line with one side of these slots, and at an angle with the rear faces of these plates, are cast or otherwise secured the lugs F, to which the cutters or knives G are secured, to act upon the same principle as that involved in the setting and operation of plane-irons, the slots being wide enough not only to admit the cutters, but also to act as throats through which the shavings are discharged. To the front of the frame are secured the supports for the bed or rest H, which is pivoted to said supports I at $a$. Through these supports are the slots $b$, by means of which and the set-screws $d$ the inclination of the bed or rest is secured, as may be necessary. J is a gauge upon the bed or rest, by means of which the staves are guided at one end to make them uniform.

It will be noticed that the cutters project beyond the periphery of these plates in order to cut past the center of the length of the staves. To enable them to do this and at the same time not interfere with the relative position of the plates, it is necessary to cut in the edges of the plates the semicircular notches $h$, coincident with the projecting knives on the companion-plate.

K is a cradle, into which the staves may be dropped after being jointed.

What I claim as my invention, and desire to secure by Letters Patent, is—

1. The combination of the face-plates D provided with slots E and semicircular notches $h$, the knives G, shafts B, and frames A, the supports I provided with the slots $b$, and the bed or rest H pivoted thereto at $a$, and provided with set-screws $d$ and gauge J, all constructed, arranged, and operated as described and shown.

2. The arrangement of the frame A, shafts B, pulley C, face-plates D, lugs F, knives G, bed H, supports I, and cradle K, when each part is constructed, combined, and operates substantially as and for the purposes set forth.

FREDERIC P. DEUEL.

Witnesses:
THOS. S. SPRAGUE,
H. F. EBERTS.